United States Patent
Lee et al.

(10) Patent No.: US 7,841,770 B2
(45) Date of Patent: Nov. 30, 2010

(54) TEMPERATURE MEASURING SYSTEM AND MEASURING METHOD USING THE SAME

(75) Inventors: Ean-Sue Lee, Taipei (TW); Po-Yin Chao, Taipei (TW)

(73) Assignee: Hycon Technology Corp., Danshui Town, Taipei County (TW)

( * ) Notice: Subject to any disclaimer, the term of this patent is extended or adjusted under 35 U.S.C. 154(b) by 415 days.

(21) Appl. No.: 12/155,035

(22) Filed: May 29, 2008

(65) Prior Publication Data

US 2009/0296780 A1    Dec. 3, 2009

(51) Int. Cl.
*G01K 7/00* (2006.01)
*H01L 35/00* (2006.01)

(52) U.S. Cl. ...................... 374/178; 327/512

(58) Field of Classification Search ............ 374/178, 374/170; 327/512
See application file for complete search history.

(56) References Cited

U.S. PATENT DOCUMENTS

| | | | | |
|---|---|---|---|---|
| 5,892,221 A | * | 4/1999 | Lev | 250/222.1 |
| 6,008,685 A | * | 12/1999 | Kunst | 327/512 |
| 6,242,974 B1 | * | 6/2001 | Kunst | 330/9 |
| 6,808,307 B1 | * | 10/2004 | Aslan et al. | 374/178 |
| 6,991,369 B1 | * | 1/2006 | Garavan | 374/178 |
| 7,082,377 B1 | * | 7/2006 | Aslan et al. | 702/130 |
| 2008/0259998 A1 | * | 10/2008 | Venkataraman et al. | 374/170 |

* cited by examiner

*Primary Examiner*—Lisa M Caputo
*Assistant Examiner*—Mirellys Jagan
(74) *Attorney, Agent, or Firm*—Bacon & Thomas, PLLC

(57) ABSTRACT

A temperature measuring system and a measuring method using the same are disclosed. The method for measuring an integrated circuit temperature includes the steps of: detecting a first difference in output voltage values between a first transistor and a second transistor by providing a first current through the first transistor and a second current through the second transistor; detecting a second difference in output voltage values between the first transistor and the second transistor by providing the second current through the first transistor and the first current through the second transistor; obtaining an average value by averaging the first difference and the second difference; and determining the temperature by multiplying the average value with a predetermined value.

17 Claims, 3 Drawing Sheets

TEMPERATURE MEASURING SYSTEM AND MEASURING METHOD USING THE SAME

FIELD OF THE INVENTION

The present invention relates to a temperature measuring system and measuring method using the same, and more particularly, to a temperature measuring system for measuring an integrated circuit temperature in a device, such as a laptop computer or a projector.

BACKGROUND OF THE INVENTION

Integrated circuit devices, such as processors, microcontrollers, application specific integrated circuits (ASICs), programmable logic devices (PLDs), programmable logic arrays (PLAs), complex programmable logic devices (CPLDs), and field programmable gate arrays (FPGAs), can include numerous types of discrete circuit components, including transistors, resistors, and capacitors, as well as other components or circuit structures. Device designers and manufacturers routinely attempt to increase the speed and performance of such integrated circuit devices while at the same time reducing die and/or package size and maintaining device reliability. However, the presence of hundreds of thousands or millions of closely-spaced transistors and other discrete components exhibiting sub-micron dimensions and operating at high clock rates inevitably causes the device to exhibit high power dissipation and heating.

High temperatures can damage or destroy integrated circuit components, and operation of an integrated circuit at a temperature above a certain level can be indicative of design or manufacturing defects in the device. Consequently, many systems, devices, and techniques exist for measuring and monitoring integrated circuit temperature.

When temperature is measured in an integrated circuit, a semiconductor junction is often used in the process. By manipulating the currents and the current densities through the junction, changes in voltage can be measured across the junction. A change in voltage at two current densities across the junction can be measured and used by a temperature sensor to calculate temperature. Most junctions employed for this purpose are parasitic vertical PNP silicon based transistors. However, it should be appreciated that NPN transistors or even diodes may be used instead.

The classic transistor equation determines a change in the base emitter voltage ($\Delta V_{BE}$) for a PNP transistor as follows:

$$\Delta V_{BE} = \eta \frac{kT}{q} \ln\left[\frac{I_{C2}}{I_{C1}}\right]$$

where $\eta$ is a non-ideality constant substantially equivalent to 1.00 or slightly more/less, k is the well known Boltzmann's constant, q is the electron charge, T is the temperature in Kelvin, $I_{C1}$ and $I_{C2}$ are collector currents that are present at the measurement of a first base-emitter voltage and a second base-emitter voltage respectively.

There are two basic types of temperature sensors that utilize the concept of the diode equation: "diode mode" sensors and "transistor mode" sensors. Diode mode sensors operate on the assumption that a ratio of collector currents tends to be relatively equivalent to a ratio of known emitter currents ($I_E$). Hence, for a diode mode sensor, the diode approximation of the transistor equation (or "diode equation" for short) is approximated by:

$$\Delta V_{BE} = \eta \frac{kT}{q} \ln\left[\frac{I_{E2}}{I_{E1}}\right]; \text{ where } \frac{I_{C1}}{I_{C2}} = \frac{I_{E1}}{I_{E2}}$$

In both diode mode and transistor mode sensors, a problem arises in measuring the voltage across the junction, because the actual voltage across the junction is never measured due to the fact that error terms are introduced by series resistances in the measurement path to and from the junction.

An exemplary circuit diagram of FIG. 1 illustrates one temperature measuring circuit that experiences this problem of measurement-induced error. In FIG. 1, a temperature sensor supplies a current to the emitter of a PNP transistor, and then receives an input current from the base of the same transistor. A base-emitter voltage is generated across the base-emitter junction of the transistor. However, due to the series resistance of the measurement lines, the temperature sensor actually measures a slightly different voltage than what is present across the base-emitter junction of the transistor. The series resistance is represented by resistor $R_E$ in series between the temperature sensor and the emitter of the PNP transistor and resistor $R_B$ in series between the base of the PNP transistor and the temperature sensor. The presence of these series resistances introduces error.

In the past, especially in integrated circuit production techniques at the 0.09 micron level and larger, this type of measurement-induced error could be ignored by a temperature sensor because accuracy needs were not as stringent. However, at smaller circuit production techniques, this error becomes larger and must be dealt with. A typical way to deal with this was generally to add an offset—either a resistance offset, a temperature offset, or a software offset that helps compensate for the error that is induced by the measurement. In one case, the amount of offset would be determined by simply multiplying a typical resistance of the circuit by a typical current through the circuit. In another case, the amount of offset would be determined by multiplying a typical resistance by the actual current. In either case, the offset only works in conditions where the error term has no significant temperature dependency. In the past, there was only a very small temperature dependency in the measurement errors. However, at smaller integrated circuit sizes, starting at around 65 nanometers, there is large temperature dependence in the resistances induced by measurement. As a consequence, simply dealing with these resistances through the use of some sort of offset does not yield an accurate temperature measurement at a variety of temperatures, and therefore the overall system accuracy of a temperature system suffers. A further problem exists in that some portions of the error term are non-obvious, and thus hard to identify.

As mentioned in U.S. Pat. No. 7,333,038, there are well-known techniques for dynamically canceling the effects of this series resistance on a real time basis. These techniques are only suitable for cases when the sensing junction is an actual diode or a transistor that substantially behaves like a diode, i.e. has high and constant current gain. For the small geometry processes it has been shown that the temperature sensing transistors do not behave like simple diodes, hence making these dynamic resistance correction techniques largely useless.

Offsets may have different causes in a signal processing chain of an integrated circuit. Fluctuations in the supply voltage and temperature drift effects, fluctuations in process parameters during fabrication, and matching problems between electronic components in the case of differential signal routing contribute, for example, to the occurrence of offsets.

Furthermore, in order to measure an integrated circuit temperature with the above equation, a different current is passed through the same diode, or likewise a same current is passed through two different diodes, whenever the integrated circuit temperature is to be measured. While there are many ways to measure the two voltages of two diodes at different current densities and performing subtraction and amplification in the prior art by using an analog amplifier, such methods result in error introduced due to device mismatch.

Previous temperature sensors using analog components are subject to errors arising from device mismatch. For example, if a current density ratio of 16 is used to generate the two diodes voltages, the resulting difference voltage will be only 26 mV*ln(16) or about 72 mV. This is a difficult quantity to process with an analog amplifier where typical offsets may be on the order of 10 to 20 mV. The offset of the amplifier will then present an error to the system that will vary from part to part and degrade the accuracy of the measurement irrecoverably. For this reason, the offset of the amplifier is minimized at the potential cost of complexity, die area, and power.

A discrete-time switched-capacitor amplifier can overcome offset issues by sampling and canceling the offset in between sampling and amplifying the diode voltages. This method has proven to be suitable for highly accurate sensors but at the cost of considerable complexity.

Therefore, a need exists for a temperature measuring system and a temperature measuring method that eliminates error from device mismatch, and measures temperature regardless of the offset of the amplifier with a lower cost.

SUMMARY OF THE INVENTION

Accordingly, the prior arts are limited by the above problems. It is an object of the present invention to provide a temperature measuring system and a measuring method using the same.

In accordance with an aspect of the present invention, a method for measuring an integrated circuit temperature T includes the steps of detecting a first difference in output voltage values ($\Delta V_1$) between a first transistor and a second transistor by providing a first current through the first transistor and a second current through the second transistor; detecting a second difference in output voltage values ($\Delta V_2$) between the first transistor and the second transistor by providing the second current through the first transistor and the first current through the second transistor; obtaining an average value ($V_{avg}$) by averaging the first difference $\Delta V_1$ and the second difference $\Delta V_2$; and determining the temperature T by multiplying the average value $V_{avg}$ with a default value M.

Preferably, the default value M is calculated by the following equation:

$$M = T_{ref} \div \left( \frac{\Delta V_{ref1} + \Delta V_{ref2}}{2} \right)$$

where:

$T_{ref}$ is a reference temperature in Kevin;

$\Delta V_{ref1}$ is the first difference at the reference temperature $T_{ref}$; and $\Delta V_{ref2}$ is the second difference at the reference temperature $T_{ref}$.

Preferably, the first transistor and the second transistor are bipolar junction transistors.

Preferably, the first transistor and the second transistor are PNP bipolar junction transistors.

Preferably, the first transistor and the second transistor are NPN bipolar junction transistors.

Preferably, the first current and the second current have different values.

Preferably, the first difference $\Delta V_1$ and second difference $\Delta V_2$ are detected by an analog-to-digital converter.

In accordance with another aspect of the present invention, a temperature measuring system for measuring a temperature T of an integrated circuit, includes a first transistor coupled to the integrated circuit having a first output voltage while a first current is provided therethrough and a second output voltage while a second current is provided therethrough; a second transistor coupled to the integrated circuit having a third output voltage while the first current is provided therethrough and a fourth output voltage while the second current is provided therethrough; a comparator for calculating a first difference ($\Delta V_1$) between the first output voltage and the fourth output voltage, and calculating a second difference ($\Delta V_2$) between the second output voltage and the third output voltage; and a processor for obtaining an average value ($V_{avg}$) by averaging the first difference $\Delta V_1$ and second difference $\Delta V_2$, and determining the temperature T of the integrated circuit by multiplying the average value $V_{avg}$ with a default value M.

Preferably, the default value M is calculated by the following equation:

$$M = T_{ref} \div \left( \frac{\Delta V_{ref1} + \Delta V_{ref2}}{2} \right)$$

where:

$T_{ref}$ is a reference temperature in Kevin;

$\Delta V_{ref1}$ is the first difference at the reference temperature $T_{ref}$; and $\Delta V_{ref2}$ is the second difference at the reference temperature $T_{ref}$.

Preferably, the temperature measuring system further includes an analog-to-digital converter for generating digitized voltage values of the first output voltage, the second output voltage, the third output voltage, and the fourth output voltage.

Preferably, the processor performs mapping of the digitized voltage values to temperature values.

Preferably, the temperature measuring system further includes a current source coupled to the first transistor and the second transistor for providing the first current and the second current.

Preferably, the first current and the second current have different values.

Preferably, the first transistor and the second transistor are bipolar junction transistors.

Preferably, the first transistor and the second transistor are PNP bipolar junction transistors.

Preferably, the first transistor and the second transistor are NPN bipolar junction transistors.

Preferably, the first output voltage and the second output voltage have different values, the third output voltage and the fourth output voltage have different values, the first output voltage and the fourth output voltage have different values, and the second output voltage and the third output voltage have different values.

BRIEF DESCRIPTION OF THE DRAWING

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiment. It is to be noted that the following descriptions of preferred embodiment of this invention are presented herein for purpose of illustration and description only; it is not intended to be exhaustive or to be limited to the precise form disclosed.

Figure 1:
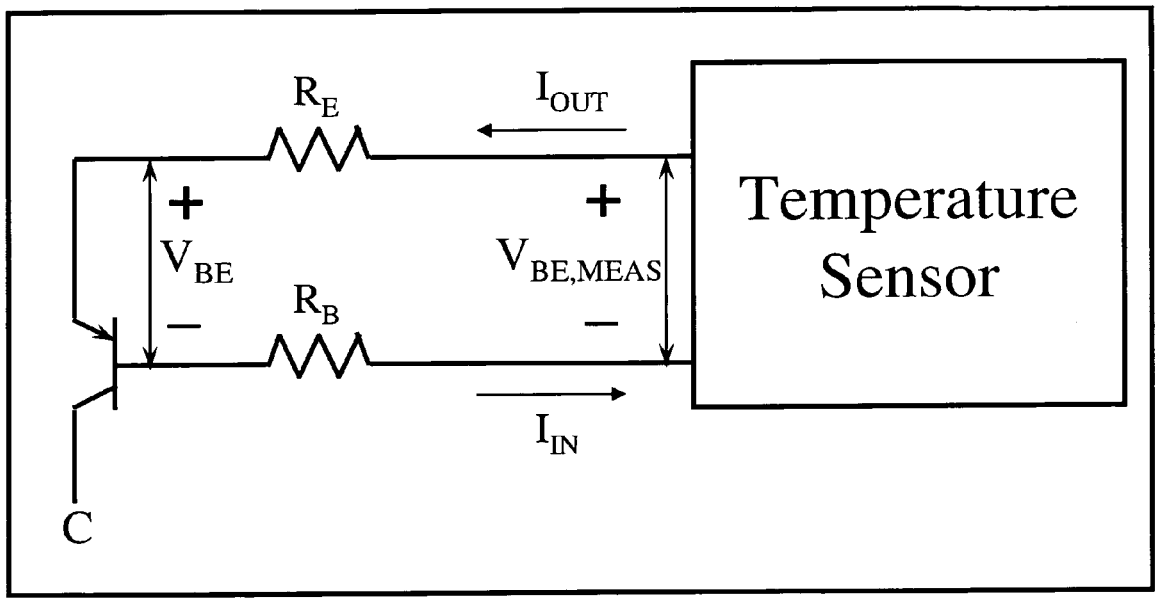
FIG. 1 illustrates a temperature measuring circuit according to the prior art.
Figure 2:
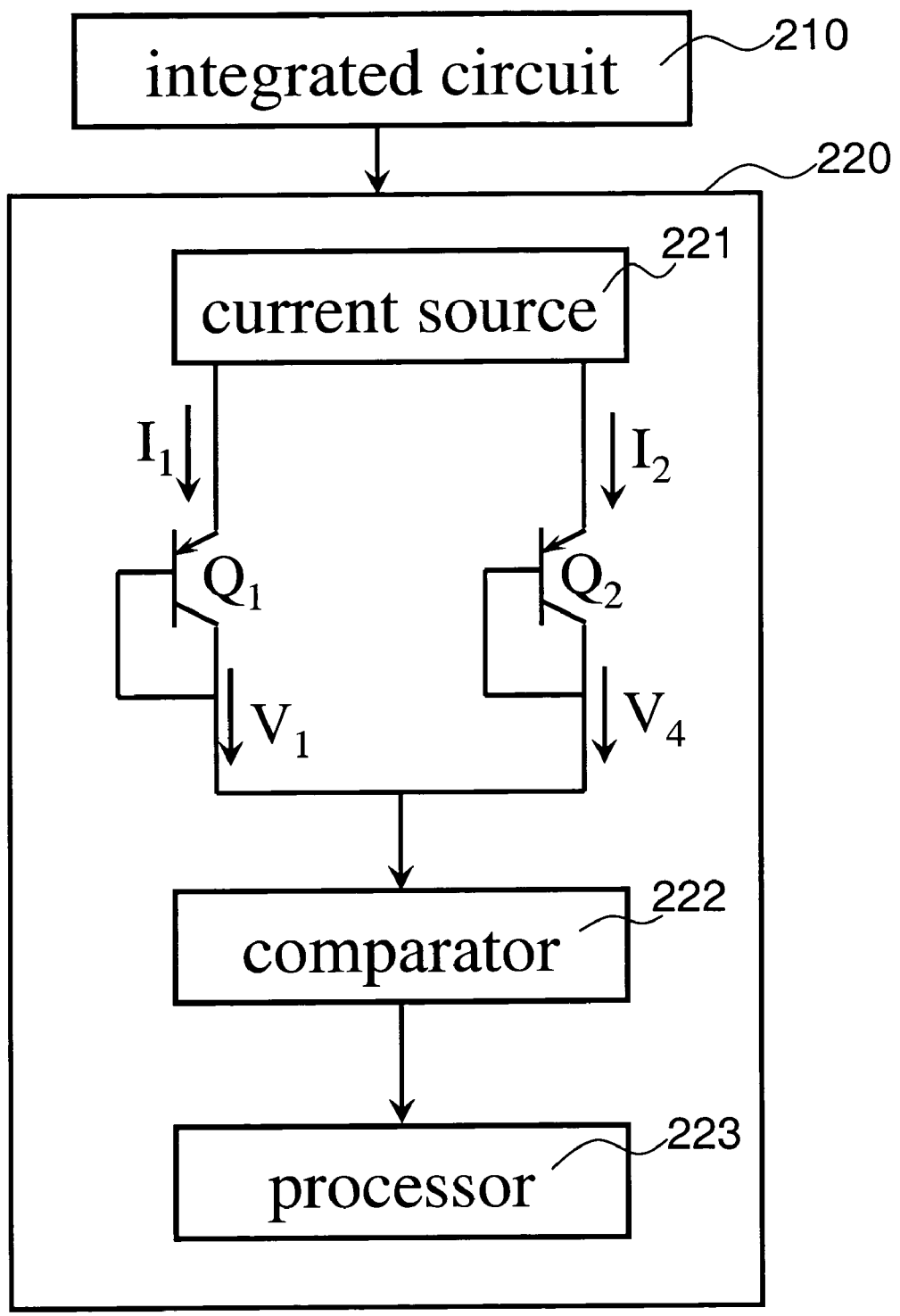
FIG. 2 is a block diagram of a temperature measuring system according to the present invention.

Please refer to FIG. 2. FIG. 2 is a block diagram of a temperature measuring system 220 according to the present invention. The temperature measuring system 220 is coupled to an integrated circuit 210 that has a temperature T to be detected. The temperature measuring system 220 has two transistors as sensing elements: a first transistor $Q_1$ and a second transistor $Q_2$. In this embodiment, the first transistor $Q_1$ and the second transistor $Q_2$ are both parasitic vertical PNP silicon based bipolar junction transistors. It should be appreciated that the embodiment disclosed herein is similarly applicable to other sensing elements such as NPN transistors or junction diodes or others. The temperature measuring system 220 can be integrated with the integrated circuit 210 on a chip or it can be a discrete unit.

The temperature measuring system 220 also includes a current source 221, a comparator 222, and a processor 223. The current source 221 provides a first current $I_1$ and a second current $I_2$ to the first transistor $Q_1$ and the second transistor $Q_2$, respectively. A voltage is measured at the comparator 222 wherein the voltage level is logarithmically related to the current that passes through it. While the first current $I_1$ passes through the first transistor $Q_1$, the first transistor $Q_1$ will generate a first output voltage $V_1$ to the comparator 222. While the second current $I_2$ passes through the first transistor $Q_1$, the first transistor $Q_1$ will generate a second output voltage $V_2$ to the comparator 222. While the first current $I_1$ passes through the second transistor $Q_2$, the second transistor $Q_2$ will generate a third output voltage $V_3$ to the comparator 222. While the second current $I_2$ passes through the second transistor $Q_2$, the second transistor $Q_2$ will generate a fourth output voltage $V_4$ to the comparator 222.

Once the comparator 222 receives voltages from the first transistor $Q_1$ and the second transistor $Q_2$, the comparator 222 will calculate the difference in output voltage values between the first transistor $Q_1$ and the second transistor $Q_2$, and then passes the result to the processor 223 for further processing.

As mentioned above, when temperature is measured in an integrated circuit, a semiconductor junction is often used in the process. By manipulating the currents and the current densities through the junction, changes in voltage can be measured across the junction. A change in voltage at two current densities across the junction can be measured and used by a temperature sensor to calculate temperature. The classic transistor equation determines a change in the base emitter voltage ($\Delta V_{BE}$) as follows:

$$\Delta V_{BE} = \eta \frac{kT}{q} \ln\left[\frac{I_{C2}}{I_{C1}}\right]$$

where $\eta$ is a non-ideality constant substantially equivalent to 1.00 or slightly more/less, k is the well known Boltzmann's constant, q is the electron charge, T is the temperature in Kelvin, and $I_{C1}$ and $I_{C2}$ are collector currents that are present at the measurement of a first base-emitter voltage and a second base-emitter voltage respectively.

The temperature measuring system of the present invention is based on the above equation. The above equation can be simplified as follows:

$$\Delta V_{BE} = V_T \ln\left[\frac{I_{C2}}{I_{C1}}\right]; \text{ where } V_T = \eta\frac{kT}{q}$$

Figure 3:
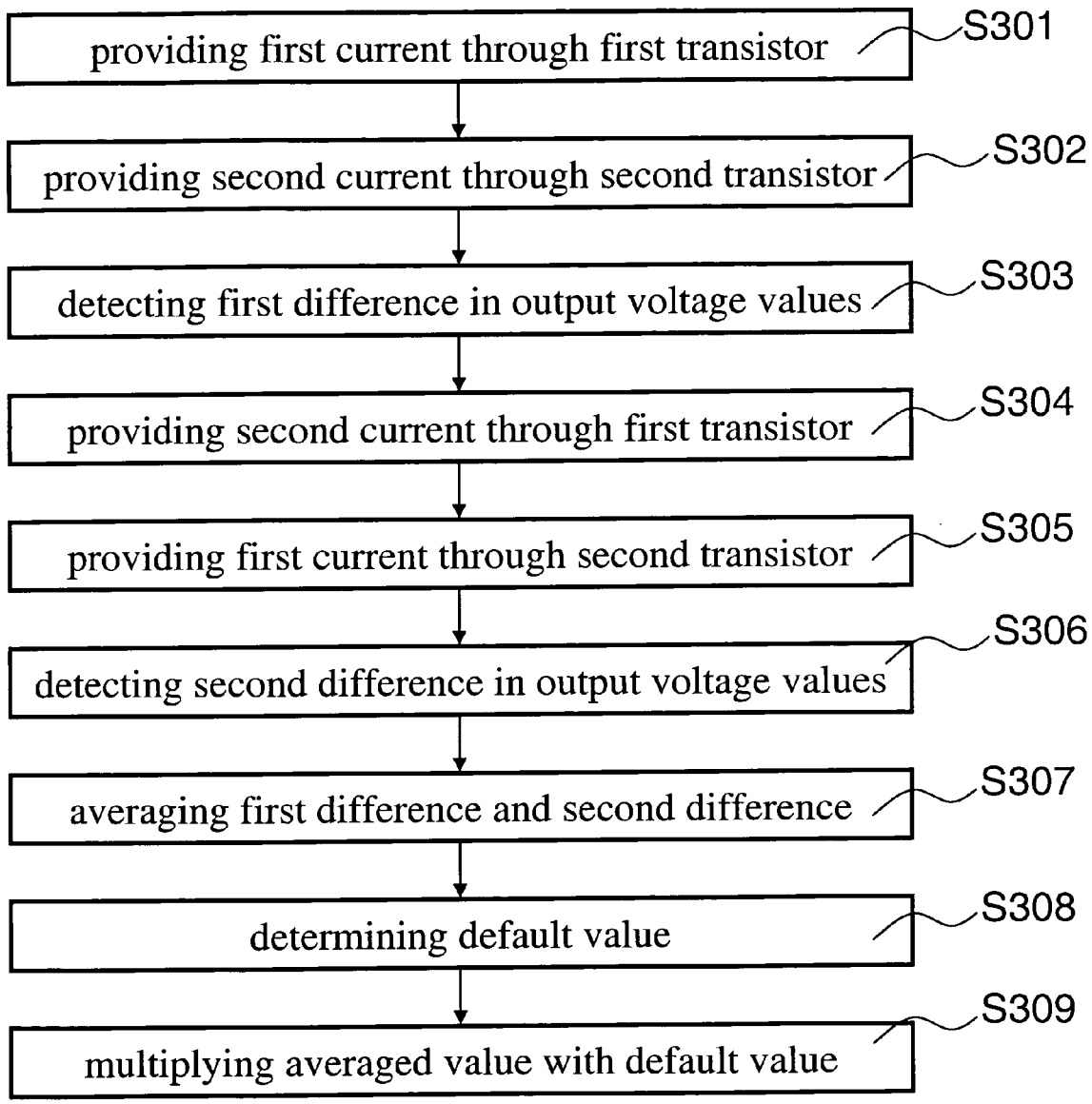
FIG. 3 is a flow chart of a temperature measuring method according to the present invention.

Please refer to FIG. 3. FIG. 3 is a flow chart of a temperature measuring method according to the present invention. The proposed solution here is to provide a first current $I_1$ through a first transistor $Q_1$, as shown in step S301. Next, at step S302, a second current $I_2$ is provided through a second transistor $Q_2$, where $I_1 \neq I_2$. As mentioned above, the first transistor $Q_1$ generates a first output voltage $V_1$ while the first current $I_1$ passes therethrough, and the second transistor $Q_2$ generates a fourth output voltage $V_4$ while the second current $I_2$ passes therethrough.

At step S303, a comparator 222 then detects the first output voltage $V_1$ from the first transistor $Q_1$ and the fourth output voltage $V_4$ from the second transistor $Q_2$, and calculates a first difference ($\Delta V_{1-4}$) between the first output voltage $V_1$ and the fourth output voltage $V_4$.

After that, at step S304, the second current $I_2$ is provided through the first transistor $Q_1$. Next, at step S305, the first current $I_1$ is provided through the second transistor $Q_2$. As mentioned above, the first transistor $Q_1$ generates a second output voltage $V_2$ while the second current $I_2$ passes therethrough and the second transistor $Q_2$ generates a third output voltage $V_3$ while the first current $I_1$ passes therethrough.

Then, at step S306, the comparator 222 detects the second output voltage $V_2$ from the first transistor $Q_1$ and the third output voltage $V_3$ from the second transistor $Q_2$, and calculates a second difference ($\Delta V_{2-3}$) between the second output voltage $V_2$ and the third output voltage $V_3$.

In this embodiment, the first current $I_1$ has a current value that is equal to eight times that of the second current $I_2$. Therefore, according to the aforementioned equation, $\Delta V_{1-4} = V_T * \ln(8I_2/I_1)$ and $\Delta V_{2-3} = V_T * \ln(8I_1/I_2)$.

As mentioned above, the comparator 222 will pass the results of the first difference $\Delta V_{1-4}$ (ex., 102.47 mV at 25K while having an offset of 0.001 mV) and the second difference $\Delta V_{2-3}$ (ex., −102.45 mV at 25K while having an offset of 0.001 mV) to the processor 223. If an offset exists in the temperature measuring system 220, then the processor 223 will receive results $\Delta V_{1-4}'$ and $\Delta V_{2-3}'$ including the offset (having a voltage value of $V_{offset}$):

$$\Delta V_{1-4}' = \Delta V_{1-4} + V_{offset}; \text{ and} \quad (1)$$

$$\Delta V_{2-3}' = \Delta V_{2-3} + V_{offset} \quad (2)$$

Due to the fact that the first current $I_1$ has a current value that is equal to eight times that of the second current $I_2$, the voltage values of the first output voltage $V_1$ and the third output voltage $V_3$ are larger than the voltage values of the second output voltage $V_2$ and the fourth output voltage $V_4$, and therefore, $\Delta V_{1-4}$ is positive and $\Delta V_{2-3}$ is negative. Hence, the aforementioned equations (1) and (2) can be rewritten as below:

$$\Delta V_{1-4}' = \Delta V_{1-4} + V_{offset}; \text{ and} \quad (3)$$

$$-\Delta V_{2-3}' = -\Delta V_{2-3} + V_{offset} \quad (4)$$

Subtracting equation (4) from (3) will cancel the offset and obtain the following equation:

$$\Delta V_{1-4}' + \Delta V_{2-3}' = \Delta V_{1-4} + \Delta V_{2-3} \quad (5)$$

Equation (5) can derive as below:

$$
\begin{aligned}
V_{avg} &= (\Delta V_{1-4}' + \Delta V_{2-3}')/2 = (\Delta V_{1-4} + \Delta V_{2-3})/2 \quad (6) \\
&= \left(V_T \ln\left[\frac{8I_2}{I_1}\right] + V_T \ln\left[\frac{8I_1}{I_2}\right]\right)/2 \\
&= \left(V_T \ln\left[\frac{8I_2}{I_1} \times \frac{8I_1}{I_2}\right]\right)/2 \\
&= (2V_T \ln 8)/2 \\
&= V_T \ln 8 \\
&= \eta \frac{kT}{q} \ln 8 \\
&= \left(\eta \frac{k}{q} \ln 8\right) \times T
\end{aligned}
$$

Accordingly, an average ($V_{avg}$) of the first difference $\Delta V_{1-4}$ and the second difference $\Delta V_{2-3}$ will be equal to an average value calculated by the processor 223, that is to say, the offset can be neglected while averaging.

According to equation (6), the average $V_{avg}$ of the first difference $\Delta V_{1-4}$ and the second difference $\Delta V_{2-3}$ will be equal to a constant times temperature T.

Hence, at step S307, an average value ($V_{avg-ref}$) of a first difference ($\Delta V_{ref1}$) and a second difference ($\Delta V_{ref2}$) is calculated at a reference temperature $T_{ref}$. Once the average value $V_{avg-ref}$ at the reference temperature $T_{ref}$ is known, since $$V_{avg-ref} = \left(\eta \frac{k}{q} \ln 8\right) \times T_{ref} \text{ and } V_{avg-T} = \left(\eta \frac{k}{q} \ln 8\right) \times T, \quad (7)$$

$$V_{avg-ref} / V_{avg-T} = T_{ref} / T,$$

and therefore, $$T = T_{ref} \times (V_{avg-T} / V_{avg-ref}) = V_{avg-T} \times (T_{ref} / V_{avg-ref})$$

$$= V_{avg-T} \times M$$

where:

T is the temperature to be detected;

$T_{ref}$ is the reference temperature;

$V_{avg-T}$ is an average value of the first difference $\Delta V_1$ and the second difference $\Delta V_2$ at the temperature T;

$V_{avg-ref}$ is the average value of the first difference $\Delta V_{ref1}$ and the second difference $\Delta V_{ref2}$ at the reference temperature $T_{ref}$; and M is equal to the reference temperature $T_{ref}$ divided by the average value $V_{avg-ref}$.

Therefore, at step S308, the value M is calculated by dividing the reference temperature $T_{ref}$ by the average value $V_{avg-ref}$ (ex., 102.46 mV at 25K). The value M (ex., 0.244 K/mV) can be set as a default value for the temperature measuring system 220. At step S309, the temperature T is calculated by multiplying the average value $V_{avg-T}$ with the default value M. By this way, the temperature T can be easily calculated by detecting a difference in voltages between two different transistors at two different currents regardless of any offsets existing in the temperature measuring system 220.

The comparator 222 in this embodiment is an analog-to-digital converter for converting the first output voltage $V_1$, the second output voltage $V_2$, the third output voltage $V_3$, and the fourth output voltage $V_4$ into digitized voltage values. Therefore, the voltage values that the processor 223 receives are actually digitized voltage values.

Furthermore, due to the fact that the first current $I_1$ and the second current $I_2$ have different values, output voltages $V_1 \neq V_2$, $V_3 \neq V_4$, $V_1 \neq V_4$, and $V_2 \neq V_3$.

With the default value M, the temperature T and the average value $V_{avg-T}$ are linearly related, and therefore, the processor 223 can perform mapping of the digitized voltage values to temperature values.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A method for measuring an integrated circuit temperature T, comprising the steps of:

detecting a first difference in output voltage values ($\Delta V_1$) between a first transistor and a second transistor by providing a first current through said first transistor and a second current through said second transistor;

detecting a second difference in output voltage values ($\Delta V_2$) between said first transistor and said second transistor by providing said second current through said first transistor and said first current through said second transistor;

obtaining an average value ($V_{avg}$) by averaging said first difference $\Delta V_1$ and said second difference $\Delta V_2$; and determining said temperature T by multiplying said average value $V_{avg}$ with a default value M.

2. The method according to claim 1, wherein said default value M is calculated by the following equation:

$$M = T_{ref} \div \left(\frac{\Delta V_{ref1} + \Delta V_{ref2}}{2}\right)$$

where:

$T_{ref}$ is a reference temperature in Kevin;

$\Delta V_{ref1}$ is the first difference at the reference temperature $T_{ref}$; and $\Delta V_{ref2}$ is the second difference at the reference temperature $T_{ref}$.

3. The method according to claim 1, wherein said first current and said second current have different values.

4. The method according to claim 1, wherein said first difference $\Delta V_1$ and second difference $\Delta V_2$ are detected by an analog-to-digital converter.

5. The method according to claim 1, wherein said first transistor and said second transistor are bipolar junction transistors.

6. The method according to claim 5, wherein said first transistor and said second transistor are PNP bipolar junction transistors.

7. The method according to claim 5, wherein said first transistor and said second transistor are NPN bipolar junction transistors.

8. A temperature measuring system for measuring a temperature T of an integrated circuit, comprising:
- a first transistor coupled to said integrated circuit having a first output voltage while a first current is provided therethrough and a second output voltage while a second current is provided therethrough;
- a second transistor coupled to said integrated circuit having a third output voltage while said first current is provided therethrough and a fourth output voltage while said second current is provided therethrough;
- a comparator for calculating a first difference ($\Delta V_1$) between said first output voltage and said fourth output voltage, and calculating a second difference ($\Delta V_2$) between said second output voltage and said third output voltage; and
- a processor for obtaining an average value ($V_{avg}$) by averaging said first difference $\Delta V_1$ and second difference $\Delta V_2$, and determining said temperature T of said integrated circuit by multiplying said average value $V_{avg}$ with a default value M.

9. The temperature measuring system according to claim 8, wherein said default value M is calculated by the following equation:

$$M = T_{ref} \div \left( \frac{\Delta V_{ref1} + \Delta V_{ref2}}{2} \right)$$

where:
- $T_{ref}$ is a reference temperature in Kevin;
- $\Delta V_{ref1}$ is the first difference at the reference temperature $T_{ref}$; and
- $\Delta V_{ref2}$ is the second difference at the reference temperature $T_{ref}$.

10. The temperature measuring system according to claim 8, wherein said first output voltage and said second output voltage have different values, said third output voltage and said fourth output voltage have different values, said first output voltage and said fourth output voltage have different values, and said second output voltage and said third output voltage have different values.

11. The temperature measuring system according to claim 8, further comprising an analog-to-digital converter for generating digitized voltage values of said first output voltage, said second output voltage, said third output voltage, and said fourth output voltage.

12. The temperature measuring system according to claim 11, wherein said processor performs mapping of said digitized voltage values to temperature values.

13. The temperature measuring system according to claim 8, further comprising a current source coupled to said first transistor and said second transistor for providing said first current and said second current.

14. The temperature measuring system according to claim 13, wherein said first current and said second current have different values.

15. The temperature measuring system according to claim 8, wherein said first transistor and said second transistor are bipolar junction transistors.

16. The temperature measuring system according to claim 15, wherein said first transistor and said second transistor are PNP bipolar junction transistors.

17. The temperature measuring system according to claim 15, wherein said first transistor and said second transistor are NPN bipolar junction transistors.

* * * * *